United States Patent
Macher

[11] 3,820,876
[45] June 28, 1974

[54] HIGH-SPEED VARIFOCAL OBJECTIVE SYSTEM

[75] Inventor: Karl Macher, Bad Kreuznach, Germany

[73] Assignee: Jos. Schneider & Co. Optische Werke, Bad Kreuznach, Germany

[22] Filed: Dec. 26, 1972

[21] Appl. No.: 318,163

[30] Foreign Application Priority Data
Dec. 28, 1971 Germany............................ 2164937

[52] U.S. Cl.................................. 350/184, 350/214
[51] Int. Cl.............................................. G02b 15/16
[58] Field of Search........................... 350/184, 186

[56] References Cited
UNITED STATES PATENTS
3,346,320 10/1967 Macher............................... 350/184
3,442,573 5/1969 Macher............................. 350/184 X FOREIGN PATENTS OR APPLICATIONS
16,024 4/1971 Japan................................... 350/184

*Primary Examiner*—John K. Corbin
*Attorney, Agent, or Firm*—Karl F. Ross; Herbert Dubno

[57] ABSTRACT

A zoom-type objective system designed for Super-8 motion-picture cameras includes a fixed-focus basic objective and a varifocal front attachment with two fixed positive components bracketing two axially movable negative components. The attachment and the basic objective are separated by a reflex prism which may be removed to enable relocation of the basic objective into a forward position suitable for close-ups. Several combinations of the same basic objective with different attachments are disclosed, the interchange of certain of these attachments enabling a modification of the zoom range.

8 Claims, 14 Drawing Figures

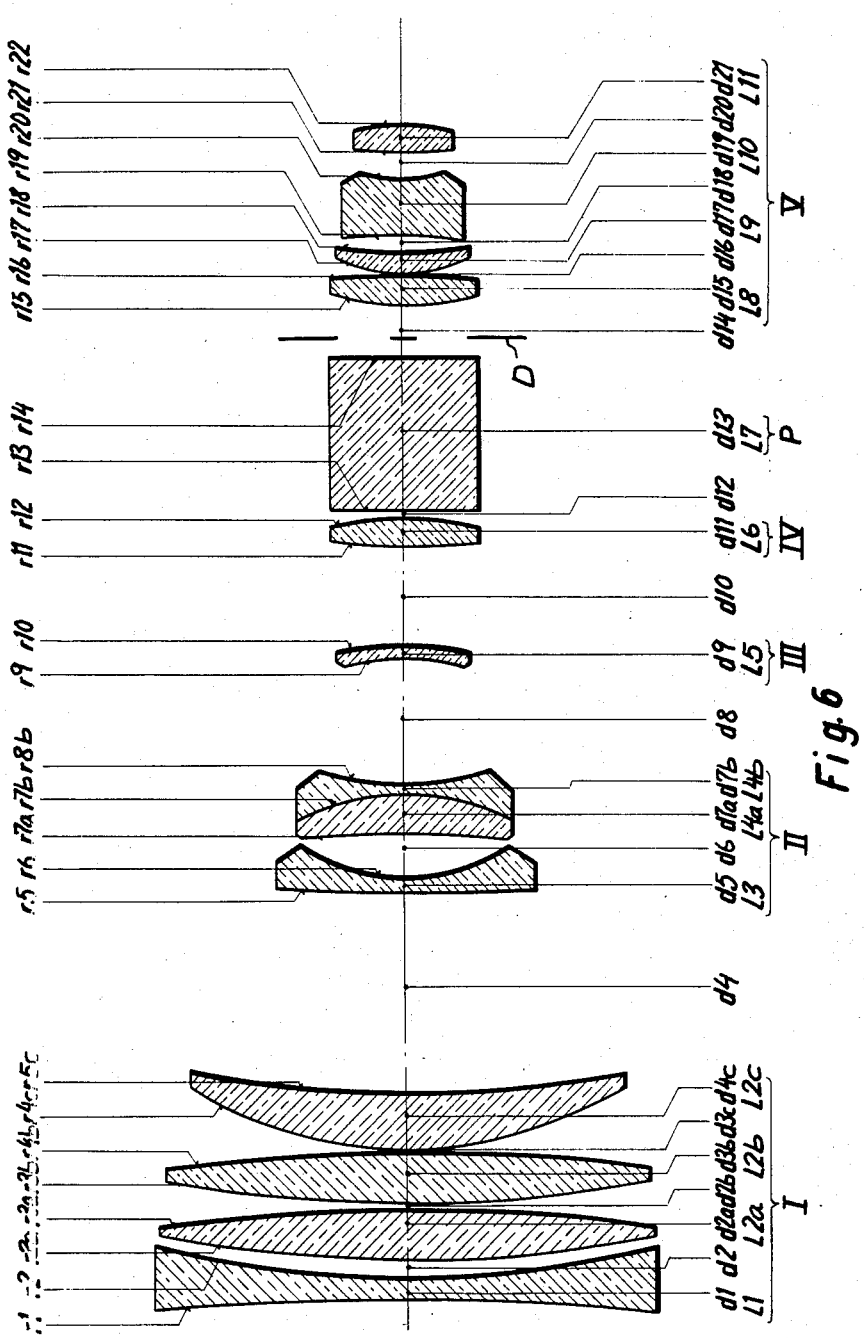

HIGH-SPEED VARIFOCAL OBJECTIVE SYSTEM

FIELD OF THE INVENTION

My present invention relates to a high-speed objective system of variable focal length, comprising a fixed-focus basic objective and a varifocal front attachment with two axially movable components.

BACKGROUND OF THE INVENTION

Varifocal objective systems of this general type have been disclosed in a number of commonly owned U.S. Pats., including Nos. 3,057,257, 3,273,457 and 3,457,003. In each case the basic multilens objective or rear lens group consists of four air-spaced singlets, all but the third of them being positively refracting, whereas the attachment or front lens group has two fixed positive components bracketing two axially movable negative components. As applied particularly to the first component of the attachment, the term "fixed" does not exclude limited adjustability for focusing purposes, as is well understood in the art.

As is likewise known from some of these prior patents, a reflex prism may be inserted between the two lens groups, preferably ahead of a diaphragm so as to permit full use of a viewfinder even with the diaphragm closed.

Objects of the Invention

The general object of my present invention is to provide an improved objective system of this nature which has a large relative aperture, such as 1 : 1.8, and is highly corrected so that its residual distortions in any zoom position are no greater than those of a good fixed-focus objective of the same focal length.

A more particular object of my invention is to provide an objective system of this character which is especially adapted for use with home movie cameras, such as those of the Super-8 type.

It is also an object of this invention to provide a plurality of varifocal attachments interchangeably usable with the same basic objective to establish several optically equivalent systems of different zoom ranges.

Summmary of the Invention

Let $f_I$, $f_{II}$, $f_{III}$ and $f_{IV}$ designate the individual focal lengths of the positive first component, the negative second component, the negative third component and the positive fourth component, respectively, of the varifocal front group and let $f_V$ be the focal length of the basic objective or rear group. The system according to my invention then satisfies the following relationships:

$$f_{IV} < 0.75 f_I$$
$$|f_{III}| > 1.1 |f_{II}|$$
$$f_I < 4 f_V$$

More particularly, in keeping with the specific examples given hereinafter, $$2.5 f_V < f_I < 3 f_V$$
$$0.7 f_V < |f_{II}| < f_V$$
$$1.75 f_V < |f_{III}| < 2.5 f_V$$
$$1.4 f_V < f_{IV} < 2 f_V$$

The relative order of magnitude of the individual focal lengths of the several components is as follows:

$$f_I > |f_{III}| > f_{IV} > f_V > |f_{II}|.$$

The first (positive) component consists of a negative front lens followed by one or more positive lenses with a separation which is a small fraction of the individual focal length $f_I$ of that component, i.e., less than 10 percent of that focal length. The negative second component consists of two air-spaced dispersive lens members, either of which could be cemented. The third and fourth components are single lens members of negative or positive refractivity, respectively, which could also be of the compound type. The individual back-focal length of the first and the second component exceeds 0.9 times the corresponding focal length $f_I$ and $|f_{II}|$, respectively.

Such systems can be designed with varifocal ratios ranging between 3 : 1 and 11 : 1. The several varifocal attachments affording these different ratios all have the same overall back-focal length and differ in their physical axial length by less than 3 : 2 so that their mutual substitution represents no major problem. The position of the diaphragm and the shutter need not be changed upon such substitution of attachments. The radii of curvature of all lens surfaces are larger than the minimum focal length so that their manufacture is not particularly expensive. A favorable position of the entrance pupil allows convenient dimensioning of the objective housing. Distortion is at a minimum in all operating positions.

Upon removal of the reflex prism it is possible to shift the basic objective into a forward position in which close-ups can be taken inasmuch as the image plane for short object distances then coincides with the normal focal plane of the system.

The basic objective and the interchangeable attachments can be constructed in modular form for easy emplacement and removal.

BRIEF DESCRIPTION OF THE DRAWING

The above and other features of my invention will now be described in detail with reference to the accompanying drawing in which:

FIGS. 1A–7A are graphs giving the law of motion for the movable components of the systems of FIGS. 1–7, respectively.

SPECIFIC DESCRIPTION

Figure 1:
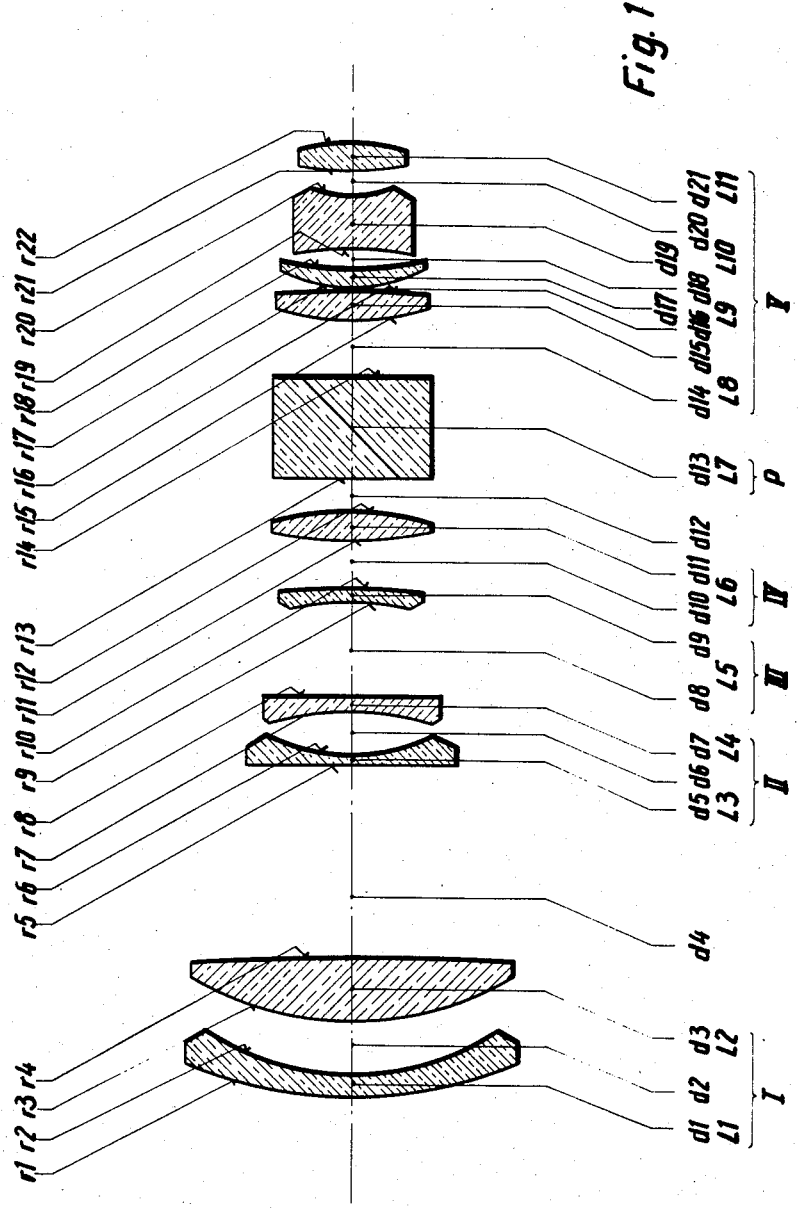
FIGS. 1–7 are diagrammatic views of different varifocal objective systems embodying my invention.

In FIG. 1 I have shown an optical objective system comprising a front attachment with four components I, II, III, IV, a reflex prism P and a basic objective V. Components II and III, which are of negative refractivity, are axially movable to change the overall focal length $f$ between a minimum value $f_{min}$ and a maximum value $f_{max}$; these components have been illustrated in an intermediate position $f_{med}$ of adjustment. All the other components are considered stationary, except that front component I (or a part thereof) may be limitedly adjustable for focusing purposes and basic objective V may be shiftable into a forward position, adjacent rear component IV of the varifocal attachment, upon removal of the reflex prism P. The system also includes a diaphragm D, shown in FIGS. 4–7, as well as a nonillustrated shutter alongside that diaphragm between prism P and basic objective V. A conventional viewfinder, not shown, receives the light rays reflected at an internal semitransparent surface of a body L7 constituting the prism P.

Front component I consists of a first lens L1 in the form of a negative meniscus, with radii $r1$, $r2$ and thickness $d1$, and a positive lens L2 (radii $r3$, $r4$ and thickness $d3$) separated from lens L1 by an air space $d2$. A variable air space $d4$ separates lens L2 from a negative meniscus L3 (radii $r5$, $r6$ and thickness $d5$) representing the first member of component II; the second member of that component, separated from lens L3 by an air space $d6$, is a nearly planoconcave lens L4 of radii $r7$, $r8$ and thickness $d7$. Another variable air space $d8$ intervenes between lens L4 and a negative lens L5 (radii $r9$, $r10$ and thickness $d9$), also meniscus-shaped, which represents the third component III. Betwen the latter component and a biconvex lens L6 (radii $r11$ and $r12$ and thickness $d11$), constituting the fourth component IV, there exists a further variable air space $d10$. Prism body L7, whose planar end faces (of infinite radius) have been indicated at $r13$ and $r14$, has a thickness $d13$ and is separated from lens L6 by an air space $d12$; an air space $d14$ exists between this prism body and the biconvex first lens L8 (radii $r15$, $r16$ and thickness $d15$) of basic objective V which is followed after an air space $d16$ by a positive meniscus L9 (radii $r17$, $r18$ and thickness $d17$); the third member of the basic objective is an asymmetrical biconcave lens L10 (radii $r19$, $r20$ and thickness $d19$) which is separated by respective air spaces $d18$ and $d20$ from lens L9 and from a final lens L11 (radii $r21$, $r22$ and thickness $d21$) of biconvex shape.

Table 1 gives representative numerical values, in suitable linear units such as millimeters, for the radii $r1$–$r22$ and the thicknesses and separations $d1$–$d21$ of the system of FIG. 1 which has a relative aperture of 1:1.8, a varifocal ratio of 1:3 ($f_{min} = 10$, $f_{max} = 30$) and a back-focal length of 13.05. Also given in the Table are the refractive indices $n_e$ and the Abbe numbers $\nu_e$ of the lens glasses, based upon the green E line of the spectrum, as well as the surface powers $\Delta n/r$ associated with the several radii. The surface powers may vary within a tolerance range $\pm 0.01\ f_{min}/f_{max}$; the tolerance range for the lens spacings is $\pm 0.4\ f_{min}$ whereas the refractive indices $n_e$ and the Abbe numbers $\nu_e$ may vary by $\pm 0.02$ and by $\pm 10$ percent, respectively. These tolerances apply also to all other embodiments as well as to the corresponding values appearing in the appended claims. The variable distances $d4$, $d8$ and $d10$ of Table 1 are given for an overall focal length $f_{med} = 20$.

TABLE 1

| Lenses | Radii | Thicknesses and separations | $n_e$ | $\nu_e$ | $\Delta n/r$ |
|---|---|---|---|---|---|
| L1 [ | r1=+41.42 | | | | +0.0191 |
| | | d1=1.80 | 1.7917 | 25.8 | |
| | r2=+24.03 | | | | −0.0329 |
| | | d2=4.50 | air space | | |
| | r3=+27.05 | | | | +0.0251 |
| L2 [ | | d3=6.00 | 1.6808 | 54.9 | |
| | r4=−183.60 | | | | +0.0037 |

TABLE 1.—Continued

| Lenses | Radii | Thicknesses and separations | $n_e$ | $\nu_e$ | $\Delta n/r$ |
|---|---|---|---|---|---|
| | | d4=16.32 | air space (variable) | | |
| | r5=+2727.00 | | | | +0.0001 |
| L3 [ | | d5=1.00 | 1.4891 | 70.2 | |
| | r6=+16.99 | | | | −0.0287 |
| | | d6=3.70 | air space | | |
| | r7=−29.74 | | | | −0.0164 |
| L4 [ | | d7=1.00 | 1.4891 | 70.2 | |
| | r8=+279.40 | | | | −0.0017 |
| | | d8=8.75 | air space (variable) | | |
| | r9=−18.46 | | | | −0.0264 |
| L5 [ | | d9=1.00 | 1.4891 | 70.2 | |
| | r10=−70.15 | | | | +0.0069 |
| | | d10=4.24 | air space (variable) | | |
| | r11=+60.03 | | | | +0.0111 |
| L6 [ | | d11=2.40 | 1.6713 | 41.6 | |
| | r12=−32.91 | | | | +0.0203 |
| | | d12=3.10 | air space | | |
| | r13=∞ | | | | ±0.0 |
| L7 [ | | d13=9.00 | 1.5187 | 63.9 | |
| | r14=∞ | | | | ±0.0 |
| | | d14=4.50 | air space | | |
| | r15=+22.56 | | | | +0.0307 |
| L8 [ | | d15=2.55 | 1.6940 | 54.4 | |
| | r16=−106.20 | | | | +0.0065 |
| | | d16=0.05 | air space | | |
| | r17=+13.29 | | | | +0.0522 |
| L9 [ | | d17=1.80 | 1.6940 | 54.4 | |
| | r18=+30.04 | | | | −0.0231 |
| | | d18=1.40 | air space | | |
| | r19=−36.19 | | | | −0.0224 |
| L10 [ | | d19=4.90 | 1.8126 | 25.2 | |
| | r20=+10.99 | | | | −0.0739 |
| | | d20=2.25 | air space | | |
| | r21=+32.69 | | | | +0.0219 |
| L11 [ | | d21=2.45 | 1.7161 | 53.6 | |
| | r22=+14.61 | | | | +0.0490 |
| | Σ d 82.71 | | | | |

Figure 1A:
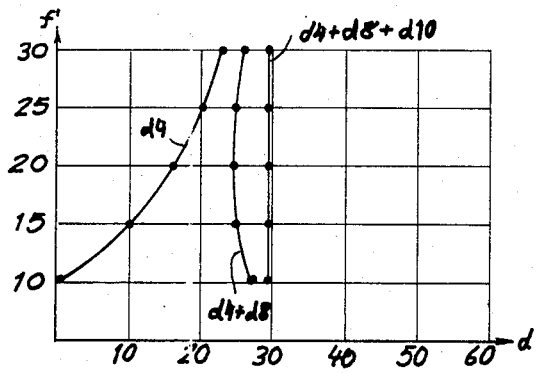

In FIG. 1A I have shown the relative variation of air spaces $d4$, $d8$ and $d10$ over the entire zoom range. Specific numerical values of these air spaces for five different overall focal lengths are given below:

| f | d4 | d8 | d10 |
|---|---|---|---|
| 10.3 | 0.15 | 27.05 | 2.10 |
| 15.0 | 9.96 | 15.62 | 3.72 |
| 20.0 | 16.31 | 8.75 | 4.24 |
| 25.0 | 20.68 | 4.72 | 3.90 |
| 30.0 | 23.91 | 2.41 | 2.98 |

The individual focal lengths for the system of FIG. 1 and Table 1 are as follows:

$$f_I = +60.0$$
$$f_{II} = -20.5$$
$$f_{III} = -51.5$$
$$f_{IV} = +32.0$$
$$f_V = +21.7$$

Figure 2A:
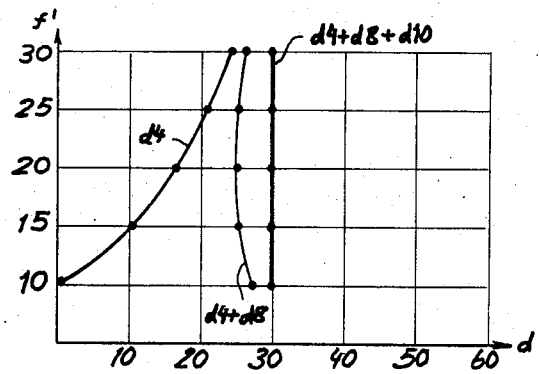
Figure 2:
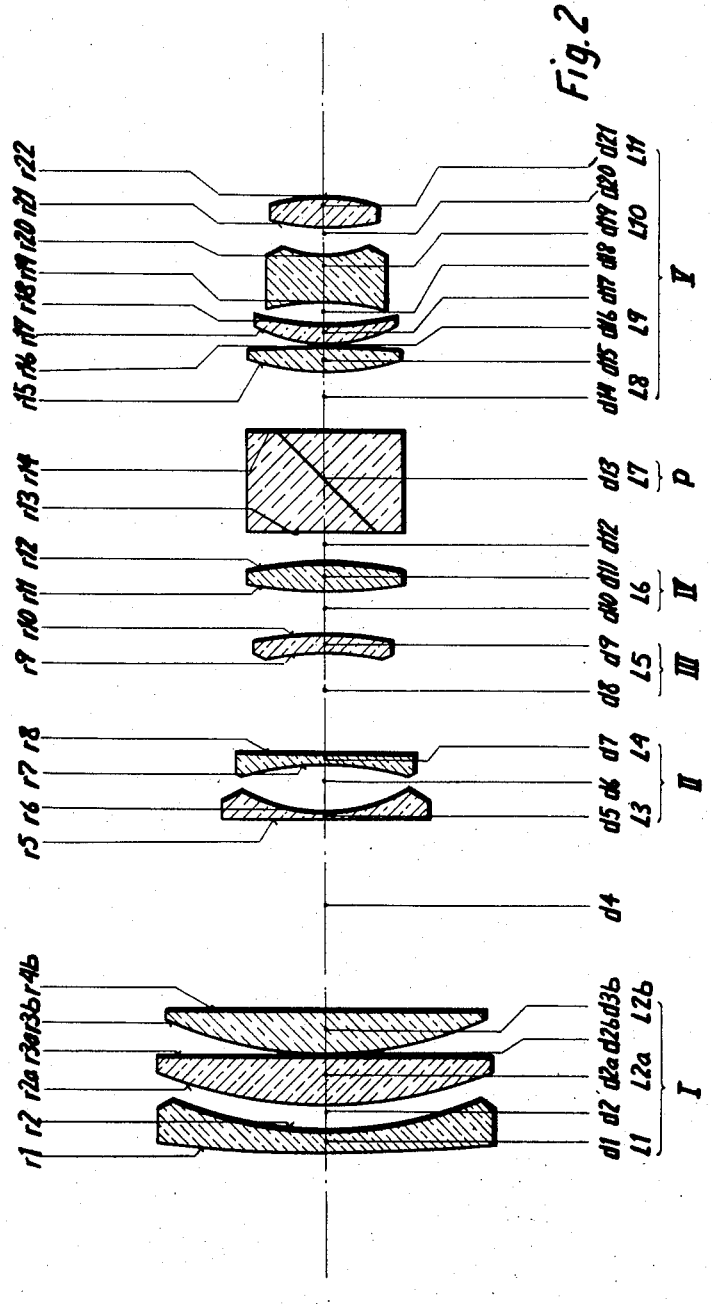

The objective system shown in FIG. 2 differs from that of FIG. 1 in that lens L2 of component I has been replaced by two nearly planoconvex lenses L2a (radii $r2a$, $r3a$ and thickness $d2a$) and L2b (radii $r3b$, $r4b$ and thickness $d3b$) separated from each other by an air space $d2b$. The remainder of the system is structurally unchanged, except for some dimensional differences that will be apparent from Table 2. This system has the same relative aperture, back-focal length and varifocal ratio as that of Table 1 and also has almost the same overall axial length $\Sigma d$. Variable air spaces $d4$, $d8$ and $d10$ are again given for an intermediate focal length $f_{med} = 20$.

TABLE 2

| Lenses | Radii | Thicknesses and separations | $n_e$ | $v_e$ | $\Delta n/r$ |
|---|---|---|---|---|---|
| L1 { | r1=+192.35 | | | | +0.0039 |
| | | d1=1.80 | 1.7616 | 27.3 | |
| | r2=+39.09 | | | | −0.0194 |
| | | d2=2.50 | air space | | |
| L2a { | r2a=+44.43 | | | | +0.0138 |
| | | d2a=4.00 | 1.6167 | 54.8 | |
| | r3a=−958.00 | | | | +0.0006 |
| | | d2b=0.10 | air space | | |
| L2b { | r3b=+37.56 | | | | +0.0164 |
| | | d3b=3.80 | 1.6176 | 50.8 | |
| | r4b=∞ | | | | ±0.0 |
| | | d4=16.54 | air space (variable) | | |
| L3 { | r5=+2727.00 | | | | +0.0001 |
| | | d5=1.00 | 1.4891 | 70.2 | |
| | r6=+16.99 | | | | −0.0287 |
| | | d6=3.70 | air space | | |
| L4 { | r7=−32.50 | | | | −0.0150 |
| | | d7=1.00 | 1.4891 | 70.2 | |
| | r8=+158.20 | | | | −0.0030 |
| | | d8=8.55 | air space (variable) | | |
| L5 { | r9=−18.46 | | | | −0.0264 |
| | | d9=1.00 | 1.4891 | 70.2 | |
| | r10=−70.15 | | | | +0.0069 |
| | | d10=4.31 | air space (variable) | | |
| L6 { | r11=+60.03 | | | | +0.0111 |
| | | d11=2.40 | 1.6713 | 41.6 | |
| | r12=−32.91 | | | | +0.0203 |
| | | d12=3.10 | air space | | |
| L7 { | r13=∞ | | | | ±0.0 |
| | | d13=9.00 | 1.5187 | 63.9 | |
| | r14=∞ | | | | ±0.0 |
| | | d14=4.50 | air space | | |
| L8 { | r15=+22.56 | | | | +0.0307 |
| | | d15=2.55 | 1.6940 | 54.4 | |
| | r16=−106.20 | | | | +0.0065 |
| | | d16=0.05 | air space | | |
| L9 { | r17=+13.29 | | | | +0.0522 |
| | | d17=1.80 | 1.6940 | 54.4 | |
| | r18=+30.04 | | | | −0.0231 |
| | | d18=1.40 | air space | | |
| L10 { | r19=−36.19 | | | | −0.0224 |
| | | d19=4.90 | 1.8126 | 25.2 | |
| | r20=+10.99 | | | | −0.0739 |
| | | d20=2.25 | air space | | |
| L11 { | r21=+32.69 | | | | +0.0219 |
| | | d21=2.45 | 1.7161 | 53.6 | |
| | r22=−14.61 | | | | +0.0490 |
| | Σ d 82.70 | | | | |

FIG. 2A shows the law of variation of air spaces $d4$, $d8$ and $d10$ throughout the zoom range in the system of FIG. 2. Representative numerical values for five focal lengths are as follows:

| $f$ | d4 | d8 | d10 |
|---|---|---|---|
| 10.2 | 0.06 | 27.26 | 2.08 |
| 15.0 | 10.17 | 15.45 | 3.78 |
| 20.0 | 16.54 | 8.55 | 4.31 |
| 25.0 | 20.92 | 4.49 | 3.99 |
| 30.0 | 24.16 | 2.17 | 3.07 |

The individual focal lengths for this system are the same as in the first embodiment.

Figure 3A:
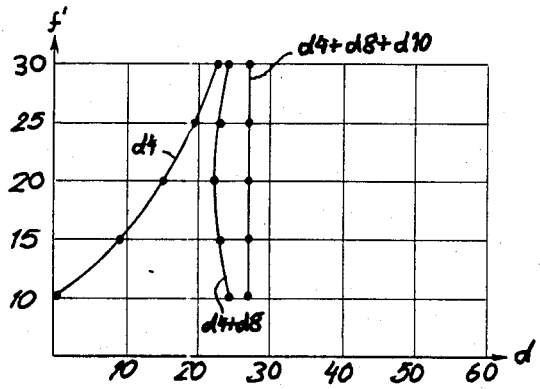
Figure 3:
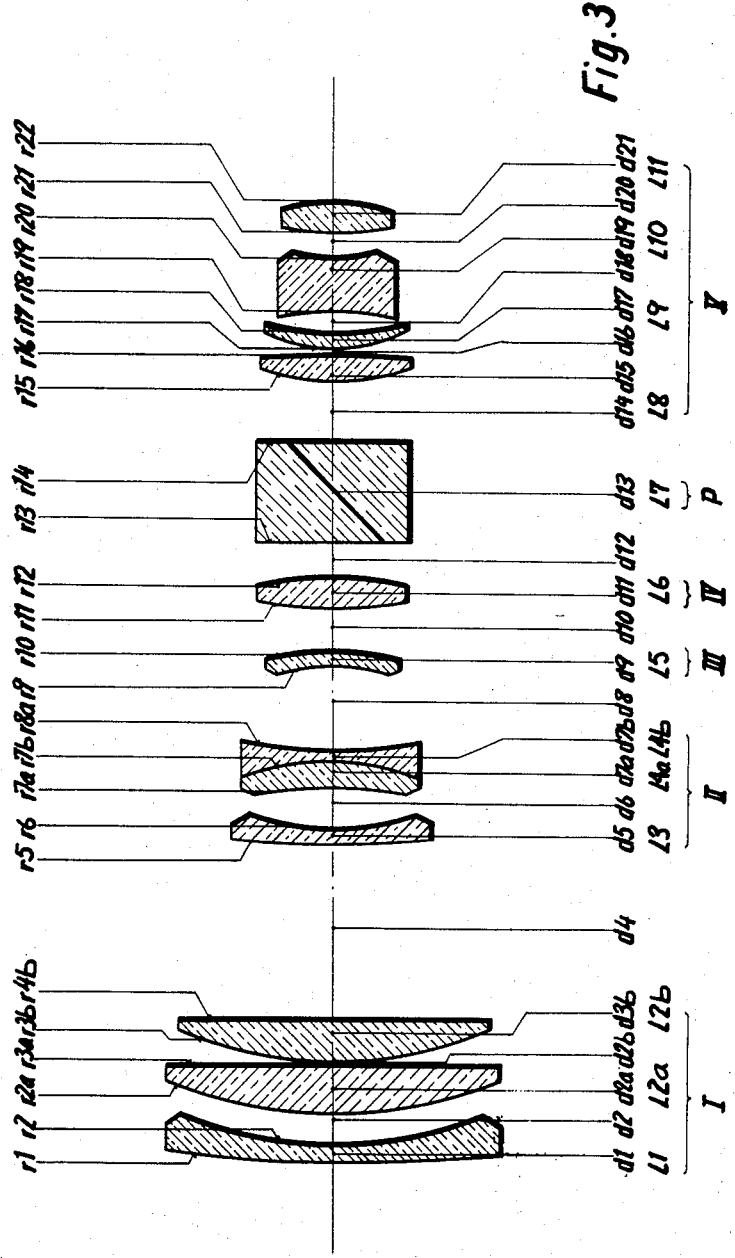

In FIG. 3 I have shown a system similar to that of FIG. 2, except for a replacement of the singlet L4 in component II by a doublet consisting of a positive lens L4a (radii r7a, r7b and thickness d7a) and a negative lens L4b (radii r7b, r8b and thickness d7b).

Reference is made to Table 3 for the parameters of the system of FIG. 3. This system has the same varifocal ratio, relative aperture, back-focal length, overall axial length and intermediate focal length $f_{med}$ as the preceding one.

TABLE 3

| Lenses | Radii | Thicknesses and separations | $n_e$ | $v_e$ | $\Delta n/r$ |
|---|---|---|---|---|---|
| L1 { | r1=+181.00 | | | | +0.0042 |
| | | d1=1.80 | 1.7616 | 27.3 | |
| | r2=+38.99 | | | | −0.0195 |

TABLE 3.—Continued

| Lenses | Radii | Thicknesses and separations | $n_e$ | $v_e$ | $\Delta n/r$ |
|---|---|---|---|---|---|
| | | d2=2.50 | air space | | |
| L2a { | r2a=+43.00 | | | | +0.0141 |
| | | d2a=4.00 | 1.6099 | 56.3 | |
| | r3a=−451.00 | | | | +0.0013 |
| | | d2b=0.10 | air space | | |
| L2b { | r3b=+35.96 | | | | +0.0173 |
| | | d3b=3.80 | 1.6254 | 56.6 | |
| | r4b=+641.50 | | | | −0.0009 |
| | | d4=15.51 | air space (variable) | | |
| L3 { | r5=+11342.00 | | | | +0.0001 |
| | | d5=1.00 | 1.6228 | 60.0 | |
| | r6=+19.23 | | | | −0.0323 |
| | | d6=3.70 | air space | | |
| L4a { | r7a=−43.87 | | | | −0.0185 |
| | | d7a=2.40 | 1.8126 | 25.2 | |
| | r7b=−20.01 | | | | +0.0094 |
| L4b { | | d7b=1.00 | 1.6228 | 60.0 | |
| | r8b=+79.77 | | | | −0.0078 |
| | | d8=7.33 | air space (variable) | | |
| L5 { | r9=−14.20 | | | | −0.0360 |
| | | d9=1.00 | 1.5120 | 64.0 | |
| | r10=−31.49 | | | | +0.0162 |
| | | d10=4.17 | air space (variable) | | |
| L6 { | r11=+60.03 | | | | +0.0104 |
| | | d11=2.40 | 1.6250 | 52.8 | |
| | r12=−29.54 | | | | +0.0211 |
| | | d12=3.10 | air space | | |
| L7 { | r13=∞ | | | | ±0.0 |
| | | d13=9.00 | 1.5178 | 63.9 | |
| | r14=∞ | | | | ±0.0 |
| | | d14=4.50 | air space | | |
| L8 { | r15=+22.56 | | | | +0.0307 |
| | | d15=2.55 | 1.6940 | 54.4 | |
| | r16=−106.20 | | | | +0.0065 |
| | | d16=0.05 | air space | | |
| L9 { | r17=+13.29 | | | | +0.0522 |
| | | d17=1.80 | 1.6940 | 54.4 | |
| | r18=+30.04 | | | | −0.0231 |
| | | d18=1.40 | air space | | |
| L10 { | r19=−36.19 | | | | −0.0224 |
| | | d19=4.90 | 1.8126 | 25.2 | |
| | r20=+10.99 | | | | −0.0739 |
| | | d20=2.25 | air space | | |
| L11 { | r21=+32.69 | | | | +0.0219 |
| | | d21=2.45 | 1.7161 | 53.6 | |
| | r22=−14.61 | | | | +0.0490 |
| | Σ d 82.71 | | | | |

FIG. 3A shows the law of variation of air spaces $d4$, $d8$ and $d10$ throughout the zoom range in the system of FIG. 3. Representative numerical values for five focal lengths are as follows:

| $f$ | d4 | d8 | d10 |
|---|---|---|---|
| 10.2 | 0.24 | 24.45 | 2.31 |
| 15.0 | 9.61 | 13.55 | 3.84 |
| 20.0 | 15.50 | 7.33 | 4.17 |
| 25.0 | 19.53 | 3.84 | 3.63 |
| 30.0 | 22.50 | 1.98 | 2.52 |

The individual focal lengths for the system of FIG. 3 and Table 3 are as follows:

$$f_I = +56.0$$
$$f_{II} = -19.5$$
$$f_{III} = -51.5$$
$$f_{IV} = +32.0$$
$$f_V = +21.7$$

Figure 4A:
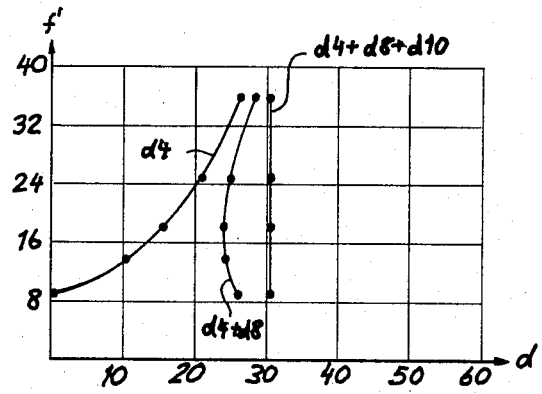
Figure 4:
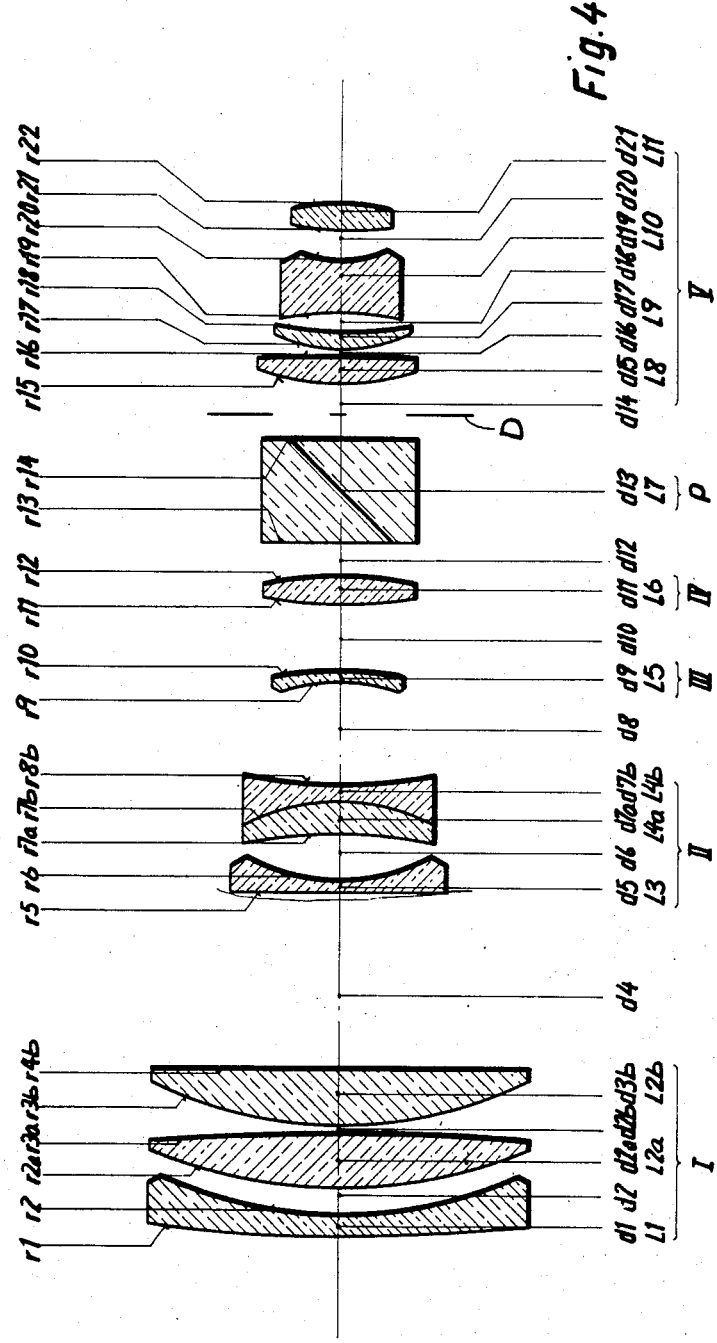

The system of FIG. 4 does not significantly differ, in structural terms, from that of FIG. 3 but is modified as to certain parameters, such as surface $r5$ of lens L3 which is now more distinctly convex than in the preceding embodiment in which it is nearly plane; see Table 4. This system has a varifocal ratio of 4:1 ($f_{min} = 9, f_{max} = 36$) but the same relative aperture of 1:1.8 and back-focal length of 13.05. The values given in the Table are for $f_{med} = 18$.

TABLE 4

| Lenses | Radii | Thicknesses and separations | $n_e$ | $\nu_e$ | $\Delta n/r$ |
|---|---|---|---|---|---|
| L1 { | r1=+184.30 | d1=1.80 | 1.7917 | 25.8 | +0.0042 |
|  | r2=+37.45 |  |  |  | −0.0211 |
|  |  | d2=2.50 | air space |  |  |
| L2a { | r2a=+44.10 | d2a=5.00 | 1.6176 | 50.8 | +0.0140 |
|  | r3a=−401.00 |  |  |  | +0.0015 |
|  |  | d2b=0.10 | air space |  |  |
| L2b { | r3b=+37.18 | d3b=5.40 | 1.6176 | 50.8 | +0.0166 |
|  | r4b=−550.50 |  |  |  | +0.0011 |
|  |  | d4=15.44 | air space (variable) |  |  |
| L3 { | r5=+477.50 | d5=1.00 | 1.6228 | 60.0 | +0.0013 |
|  | r6=+18.46 |  |  |  | −0.0337 |
|  |  | db=3.70 | air space |  |  |
| L4a { | r7a=−43.87 | d7a32 2.90 | 1.8126 | 25.2 | −0.0185 |
|  | r7b=−19.00 |  |  |  | +0.0099 |
| L4b { |  | d7b=1.50 | 1.6228 | 60.0 |  |
|  | r8b=+67.27 |  |  |  | −0.0092 |
|  |  | d8=9.01 | air space (variable) |  |  |
| L5 { | r9=−13.50 | d9=1.00 | 1.5120 | 64.0 | −0.0379 |
|  | r10=−30.31 |  |  |  | +0.0168 |
|  |  | d10=5.85 | air space (variable) |  |  |
| L6 { | r11=+57.44 | d11=2.40 | 1.5712 | 55.8 | +0.0099 |
|  | r12=−27.65 |  |  |  | +0.0206 |
|  |  | d12=3.10 | air space |  |  |
| L7 { | r13=∞ | d13=9.00 | 1.5187 | 63.9 | ±0.0 |
|  | r14=∞ |  |  |  | ±0.0 |
|  |  | d14=4.50 | air space |  |  |
| L8 { | r15=+22.56 | d15=2.55 | 1.6940 | 54.4 | +0.0307 |
|  | r16=−106.20 |  |  |  | +0.0065 |
|  |  | d16=0.05 | air space |  |  |
| L9 { | r17=+13.29 | d17=1.80 | 1.6940 | 54.4 | +0.0522 |
|  | r18=+30.04 |  |  |  | −0.0231 |
|  |  | d18=1.40 | air space |  |  |
| L10 { | r19=−36.19 | d19=4.90 | 1.8126 | 25.2 | −0.0224 |
|  | r20=+10.99 |  |  |  | −0.0739 |
|  |  | d20=2.25 | air space |  |  |
| L11 { | r21=+32.69 | d21=2.45 | 1.7161 | 53.6 | +0.0219 |
|  | r22=−14.61 |  |  |  | +0.0490 |
|  | Σ d 89.60 |  |  |  |  |

FIG. 4A shows the law of variation of air spaces $d4$, $d8$ and $d10$ throughout the zoom range in the system of FIG. 4. Representative numerical values for five focal lengths are as follows:

| f | d4 | d8 | d10 |
|---|---|---|---|
| 9.2 | 0.27 | 26.05 | 3.98 |
| 14.0 | 10.36 | 14.41 | 5.53 |
| 18.0 | 15.44 | 9.01 | 5.85 |
| 25.0 | 21.18 | 4.04 | 5.08 |
| 36.0 | 26.43 | 1.86 | 2.01 |

The individual focal lengths for the system of FIG. 4 and Table 4 are as follows:

$$f_I = +56.0$$
$$f_{II} = -19.0$$
$$f_{III} = -48.5$$
$$f_{IV} = +33.0$$
$$f_V = +21.7$$

Figure 5A:
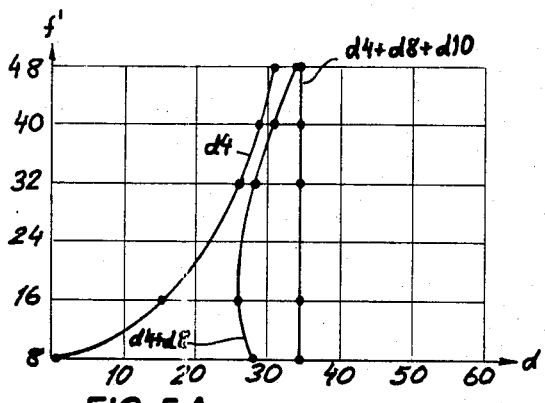
Figure 5:
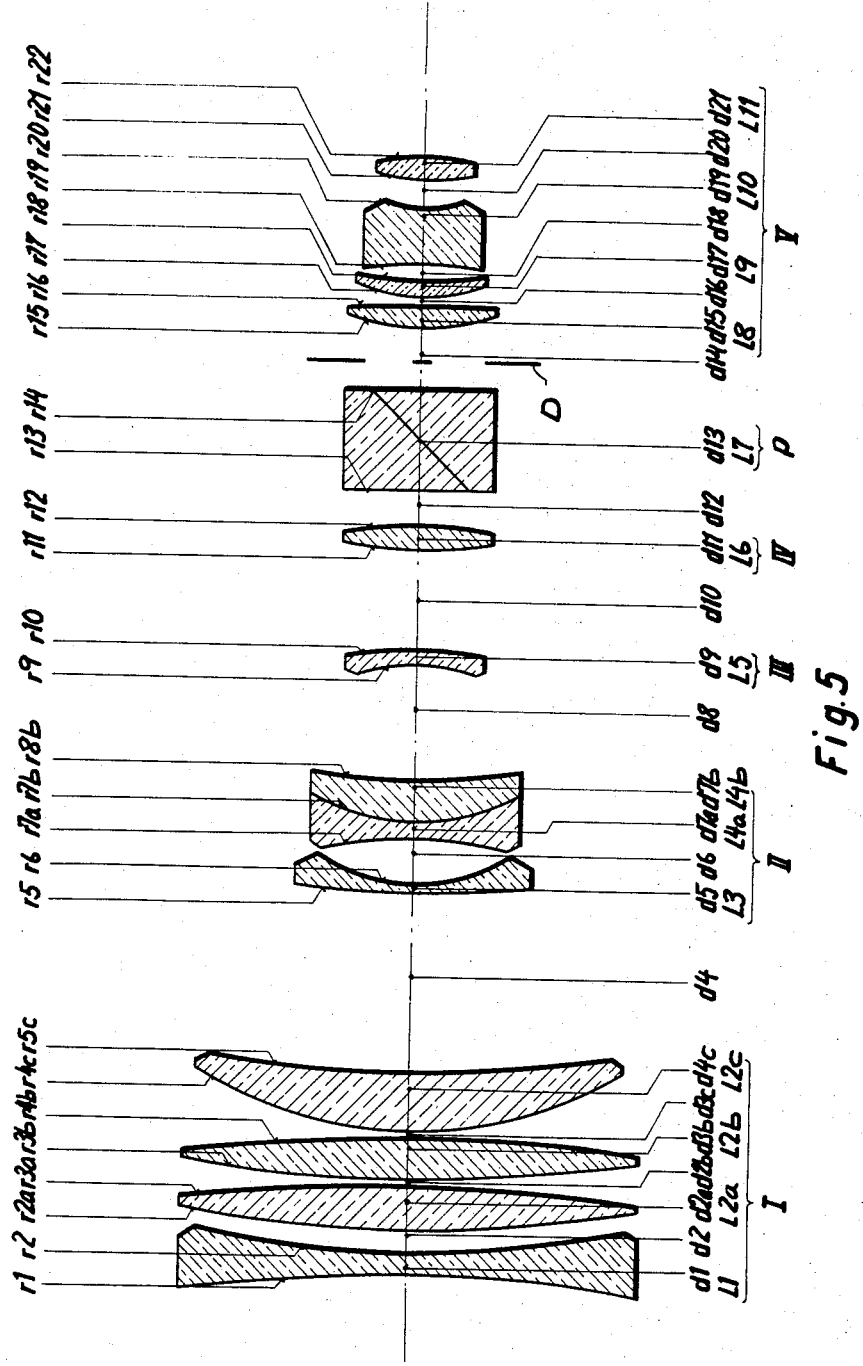

In FIG. 5 I have illustrated a further modification in which lenses L2a and L2b of component I have been supplemented by a third positive lens L2c (radii r4c, r5c and thickness d4c) separated from lens L2b by an air space d3d. The corresponding parameters have been given in Table 5 for a system of varifocal ratio 6:1 ($f_{min}=8$, $f_{max}=48$), based upon an intermediate position with $f_{med}=16$.

TABLE 5

| Lenses | Radii | Thicknesses and separations | $n_e$ | $\nu_e$ | $\Delta n/r$ |
|---|---|---|---|---|---|
| L1 { | r1=−153.40 | d1=1.80 | 1.7684 | 26.7 | −0.0050 |
|  | r2=+91.53 |  |  |  | −0.0083 |
|  |  | d2=1.80 | air space |  |  |
| L2a { | r2a=+111.98 | d2a=4.40 | 1.6228 | 60.0 | +0.0055 |
|  | r3a=−159.60 |  |  |  | +0.0039 |
|  |  | d2b=0.10 | air space |  |  |
| L2b { | r3b=+132.70 | d3b=4.40 | 1.6255 | 57.7 | +0.0047 |
|  | r4b=−132.70 |  |  |  | +0.0047 |
|  |  | d3c=0.10 | air space |  |  |
| L2c { | r4c=+37.18 | d4c=4.65 | 1.6228 | 60.0 | +0.0167 |
|  | r5c=+102.54 |  |  |  | −0.0060 |
|  |  | d4=15.87 | air space (variable) |  |  |
| L3 { | r5=+150.08 | d5=1.00 | 1.7161 | 53.6 | +0.0047 |
|  | r6=+16.28 |  |  |  | −0.0439 |
|  |  | d6=3.70 | air space |  |  |
| L4a { | r7a=−60.03 | d7a=1.50 | 1.6430 | 59.8 | −0.0107 |
|  | r7b=+17.16 |  |  |  | +0.0098 |
| L4b { |  | d7b=3.55 | 1.8126 | 25.2 |  |
|  | r8b=+62.14 |  |  |  | −0.0130 |
|  |  | d8=10.23 | air space (variable) |  |  |
| L5 { | r9=−14.55 | d9=1.00 | 1.5020 | 61.2 | −0.0345 |
|  | r10=−41.81 |  |  |  | +0.0120 |
|  |  | d10=8.50 | air space (variable) |  |  |
| L6 { | r11=+56.91 | d11=2.40 | 1.6203 | 54.8 | +0.0109 |
|  | r12=−32.91 |  |  |  | +0.0188 |
|  |  | d12=4.30 | air space |  |  |
| L7 { | r13=∞ | d13=9.00 | 1.5187 | 63.9 | ±0.0 |
|  | r14=∞ |  |  |  | ±0.0 |
|  |  | d14=4.50 | air space |  |  |
| L8 { | r15=+22.56 | d15=2.55 | 1.6940 | 54.4 | +0.0307 |
|  | r16=−106.20 |  |  |  | +0.0065 |
|  |  | d16=0.05 | air space |  |  |
| L9 { | r17=+13.29 | d17=1.80 | 1.6940 | 54.4 | +0.0522 |
|  | r18=+30.04 |  |  |  | −0.0231 |
|  |  | d18=1.40 | air space |  |  |
| L10 { | r19=−36.19 | d19=4.90 | 1.8126 | 25.2 | −0.0224 |
|  | r20=+10.99 |  |  |  | −0.0739 |
|  |  | d20=2.25 | air space |  |  |
| L11 { | r21=+32.69 | d21=2.45 | 1.7161 | 53.6 | +0.0219 |
|  | r22=−14.61 |  |  |  | +0.0490 |
|  | Σ d 98.20 |  |  |  |  |

FIG. 5A shows the law of variation of air spaces $d4$, $d8$ and $d10$ throughout the zoom range in the system of FIG. 2. Representative numerical values for five focal lengths are as follows:

| f | d4 | d8 | d10 |
|---|---|---|---|
| 8.0 | 0.48 | 27.68 | 6.44 |
| 16.0 | 15.87 | 10.23 | 8.50 |
| 32.0 | 26.58 | 2.19 | 5.83 |
| 40.0 | 29.16 | 2.19 | 3.25 |
| 48.0 | 30.94 | 3.19 | 0.47 |

The individual focal lengths for this system are given below:

$$f_I = +56.0$$
$$f_{II} = -17.8$$
$$f_{III} = -45.0$$
$$f_{IV} = +33.9$$
$$f_V = +21.7$$

The system of FIG. 6 is structurally similar to that of FIG. 5, except for a reversal of curvature of the cemented surface of doublet L4a, L4b corresponding to the showing of FIGS. 3 and 4. The corresponding parameters, listed in Table 6, provide a varifocal ratio of 6:1 ($f_{min} = 8, f_{max} = 48$) and are based on a position $f_{med} = 16$. The same aperture ratio and back-focal length obtain as in the preceding Examples.

TABLE 6

| Lenses | Radii | Thicknesses and separations | $n_e$ | $v_e$ | $\Delta n/r$ |
|---|---|---|---|---|---|
| L1 [ | r1=−155.50 | d1=1.80 | 1.7616 | 27.3 | −0.0048 |
|  | r2=+92.16 |  |  |  | −0.0082 |
|  |  | d2=1.60 | air space |  |  |
|  | r2a=+116.70 |  |  |  | +0.0053 |
| L2a [ |  | d2a=4.80 | 1.6228 | 60.0 |  |
|  | r3a=−150.82 |  |  |  | +0.0041 |
|  |  | d2b=0.10 | air space |  |  |
|  | r3b=+113.50 |  |  |  | +0.0054 |
| L2b [ |  | d3b=4.70 | 1.6228 | 60.0 |  |
|  | r4b=−163.85 |  |  |  | +0.0038 |
|  |  | d3c=0.10 | air space |  |  |
|  | r4c=+37.18 |  |  |  | +0.0167 |
| L2c [ |  | d4c=4.65 | 1.6228 | 60.0 |  |
|  | r5c=+102.54 |  |  |  | −0.0060 |
|  |  | d4=17.66 | air space (variable) |  |  |
|  | r5=+150.82 |  |  |  | +0.0046 |
| L3 [ |  | d5= 1.00 | 1.6940 | 54.4 |  |
|  | r6=+17.29 |  |  |  | −0.0401 |
|  |  | d6=3.70 | air space |  |  |
|  | r7a=−88.36 |  |  |  | −0.0091 |
| L4a [ |  | d7a=3.05 | 1.8126 | 25.2 |  |
|  | r7b=−19.64 |  |  |  | +0.0086 |
| L4b [ |  | d7b=1.00 | 1.6430 | 59.8 |  |
|  | r8=+29.13 |  |  |  | −0.0220 |
|  |  | d8=10.75 | air space (variable) |  |  |
|  | r9=−12.73 |  |  |  | −0.0392 |
| L5 [ |  | d9=1.00 | 1.4995 | 66.7 |  |
|  | r10=−35.96 |  |  |  | +0.0138 |
|  |  | d10=8.60 | air space (variable) |  |  |
|  | r11=+63.02 |  |  |  | +0.0098 |
| L6 [ |  | d11=2.40 | 1.6203 | 54.8 |  |
|  | r12=−28.09 |  |  |  | +0.0220 |
|  |  | d12=3.17 | air space |  |  |
|  | r13=∞ |  |  |  | ±0.0 |
| L7 [ |  | d13=9.00 | 1.5187 | 63.9 |  |
|  | r14=∞ |  |  |  | ±0.0 |
|  |  | d14=4.50 | air space |  |  |
|  | r15=+22.56 |  |  |  | +0.0307 |
| L8 [ |  | d15=2.55 | 1.6940 | 54.4 |  |
|  | r16=−106.20 |  |  |  | +0.0065 |
|  |  | d16=0.05 | air space |  |  |
|  | r17=+13.29 |  |  |  | +0.0522 |
| L9 [ |  | d17=1.80 | 1.6940 | 54.4 |  |
|  | r18=+30.04 |  |  |  | −0.0231 |
|  |  | d18=1.40 | air space |  |  |
|  | r19=−36.19 |  |  |  | −0.0224 |
| L10 [ |  | d19=4.90 | 1.8126 | 25.2 |  |
|  | r20=+10.99 |  |  |  | −0.0739 |
|  |  | d20=2.25 | air space |  |  |
|  | r21=+32.69 |  |  |  | +0.0219 |
| L11 [ |  | d21=2.45 | 1.7161 | 53.6 |  |
|  | r22 =−14.61 |  |  |  | +0.0490 |
|  |  | Σ d 98.98 |  |  |  |

Figure 6A:
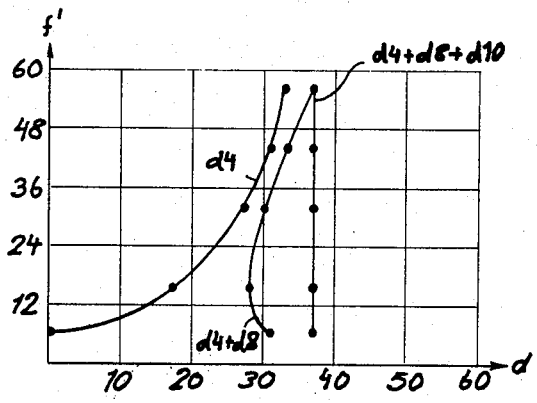

FIG. 6A shows the law of variation of air spaces d4, d8 and D10 throughout the zoom range in the system of FIG. 6. Representative numerical values for five focal lengths are as follows:

| f | d4 | d8 | d10 |
|---|---|---|---|
| 7.1 | 0.30 | 30.67 | 6.03 |
| 16.0 | 17.66 | 10.75 | 8.59 |
| 32.0 | 27.65 | 2.55 | 6.80 |
| 44.0 | 31.03 | 2.37 | 3.60 |
| 56.0 | 33.04 | 3.86 | 0.10 |

The individual focal lengths for this system are given below:

$$f_I = +56.0$$
$$f_{II} = -16.0$$
$$f_{III} = -40.0$$
$$f_{IV} = +31.6$$
$$f_V = +21.7$$

Figure 7A:
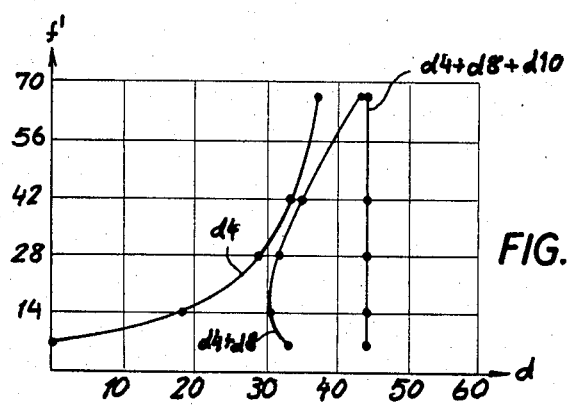
Figure 7:
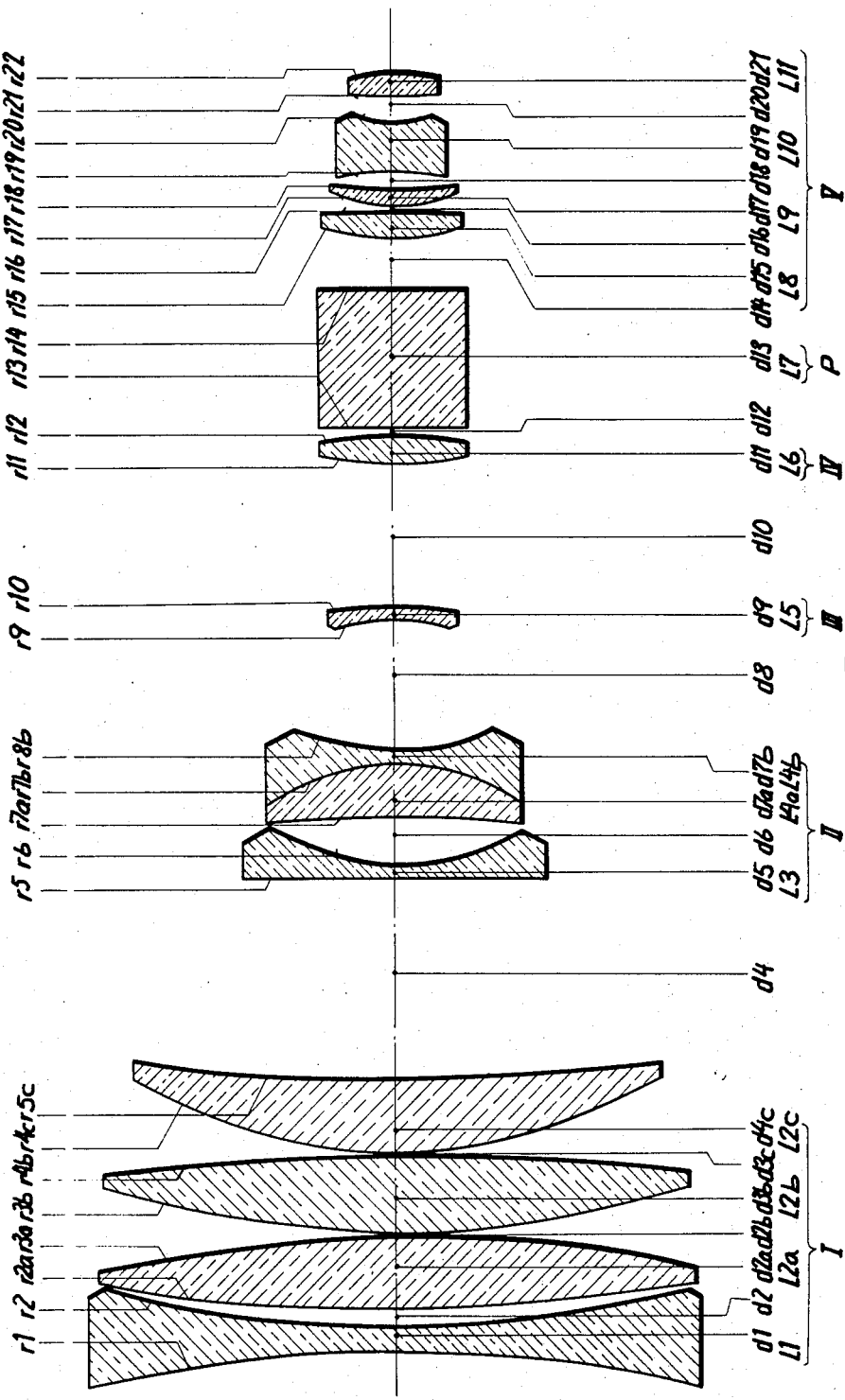

In FIG. 7, finally, I have shown a system which is basically identical with that of FIG. 6, except for a modification of certain parameters such as a less pronounced curvature at surfaces r5 and r7a. The corresponding parameters of Table 7, based on an intermediate focal length $f_{med} = 14$, yield a varifocal ratio of 11:1 ($f_{min} = 6, f_{max} = 66$); relative aperture and back-focal length are the same as before.

TABLE 7

| Lenses | Radii | Thicknesses and separations | $n_e$ | $v_e$ | $\Delta n/r$ |
|---|---|---|---|---|---|
|  | r1=−137.39 |  |  |  | −0.0055 |
| L1 [ |  | d1=2.00 | 1.7616 | 27.3 |  |
|  | r2=+110.25 |  |  |  | −0.0069 |
|  |  | d2=1.80 | air space |  |  |
|  | r2a=+188.90 |  |  |  | +0.0033 |
| L2a [ |  | d2a=6.85 | 1.6255 | 57.7 |  |
|  | r3a=−126.60 |  |  |  | +0.0049 |
|  |  | d2b=0.10 | air space |  |  |
|  | r3b=+94.06 |  |  |  | +0.0066 |
| L2b [ |  | d3b=7.20 | 1.6228 | 60.0 |  |
|  | r4b=−257.20 |  |  |  | +0.0024 |
|  |  | d3c=0.10 | air space |  |  |
|  | r4c=+48.02 |  |  |  | +0.0129 |
| L2c [ |  | d4c=6.75 | 1.6228 | 60.0 |  |
|  | r5c=+212.40 |  |  |  | −0.0029 |
|  |  | d4=18.56 | air space (variable) |  |  |
|  | r5=+496.50 |  |  |  | +0.0013 |
| L3 [ |  | d5= 1.00 | 1.6940 | 54.4 |  |
|  | r6=+22.75 |  |  |  | −0.0305 |
|  |  | d6=4.50 | air space |  |  |
|  | r7a=−137.60 |  |  |  | −0.0059 |
| L4a [ |  | d7a=5.00 | 1.8126 | 25.2 |  |
|  | r7b=−21.05 |  |  |  | +0.0080 |
| L4b [ |  | d7b=1.00 | 1.6430 | 59.8 |  |
|  | r8b=+23.27 |  |  |  | −0.0277 |
|  |  | d8=11.87 | air space (variable) |  |  |
|  | r9=−14.74 |  |  |  | −0.0331 |
| L5 [ |  | d9=1.00 | 1.4891 | 70.2 |  |
|  | r10=−56.91 |  |  |  | +0.0085 |
|  |  | d10=13.58 | air space (variable) |  |  |
|  | r11=+46.49 |  |  |  | +0.0133 |
| L6 [ |  | d11=2.40 | 1.6203 | 54.8 |  |
|  | r12=−44.43 |  |  |  | +0.0139 |
|  |  | d12=3.17 | air space |  |  |
|  | r13=∞ |  |  |  | ±0.0 |
| L7 [ |  | d13=9.00 | 1.5187 | 63.9 |  |
|  | r14=∞ |  |  |  | ±0.0 |
|  |  | d14=4.50 | air space |  |  |
|  | r15=+22.56 |  |  |  | + 0.0307 |
| L8 [ |  | d15=2.55 | 1.6940 | 54.4 |  |
|  | r16=−106.20 |  |  |  | +0.0065 |
|  |  | d16=0.05 | air space |  |  |
|  | r17=+13.29 |  |  |  | +0.0522 |
| L9 [ |  | d17=1.80 | 1.6940 | 54.4 |  |
|  | r18=+30.04 |  |  |  | −0.0231 |
|  |  | d18=1.40 | air space |  |  |
|  | r19=−36.19 |  |  |  | −0.0224 |
| L10 [ |  | d19=4.90 | 1.8126 | 25.2 |  |
|  | r20=+10.99 |  |  |  | −0.0739 |
|  |  | d20=2.25 | air space |  |  |
|  | r21=+32.69 |  |  |  | +0.0219 |
| L11 [ |  | d21=2.45 | 1.7161 | 53.6 |  |
|  | r22=−14.61 |  |  |  | +0.0490 |
|  |  | Σ d 115.78 |  |  |  |

FIG. 7A shows the law of variation of air spaces d4, d8 and d10 throughout the zoom range in the system of FIG. 7. Representative numerical values for five focal lengths are as follows:

| f | d4 | d8 | d10 |
|---|---|---|---|
| 6.2 | 0.11 | 33.04 | 10.85 |
| 14.0 | 18.55 | 11.87 | 13.58 |
| 28.0 | 29.14 | 2.76 | 12.10 |
| 42.0 | 33.57 | 2.47 | 7.96 |
| 66.0 | 36.91 | 6.77 | 0.32 |

The individual focal lengths for this system are given below:

$$f_I = +60.2$$
$$f_{II} = -16.6$$
$$f_{III} = -41.0$$
$$f_{IV} = +37.0$$
$$f_V = +21.7$$

I claim:

1. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens with a separation of less than 10 percent of the individual focal length of said first component; said second component consisting of a first and a negative second lens member air-spaced from each other; said third component being a third negative lens member; said fourth component being a positive lens member; the individual focal lengths $f_I$ of said first component, $f_{II}$ of said second component, $f_{III}$ of said third component, $f_{IV}$ of said fourth component and $f_V$ of said basic objective being related to one another as follows:

$$2.5\, f_V < f_I < 3 f_V$$
$$0.7\, f_V < |f_{II}| < f_V$$
$$1.75\, f_V < |f_{III}| < 2.5\, f_V$$
$$1.4\, f_V < f_{IV} < 2\, f_V$$
$$f_I > |f_{III}| > f_{IV} > f_V > |f_{II}|;$$

said basic objective consisting of a positive first singlet, a positive second singlet, a negative third singlet and a positive fourth singlet air-spaced from one another;

the relative numerical values of the radii $r15 - r22$ and of the thicknesses and separations $d15 - d21$ of said first singlet L8, said second singlet L9, said third singlet L10 and said fourth singlet L11, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| L8 [ | r15=+22.56 | | | | +0.0307 |
|  |  | d15=2.55 | 1.6940 | 54.4 |  |
|  | r16=−106.20 | | | | +0.0065 |
|  |  | d16=0.05 | air space | |  |
| L9 [ | r17=+13.29 | | | | +0.0522 |
|  |  | d17=1.80 | 1.6940 | 54.4 |  |
|  | r18=+30.04 | | | | −0.0231 |
|  |  | d18=1.40 | air space | |  |
| L10 [ | r19=−36.19 | | | | −0.0224 |
|  |  | d19=4.90 | 1.8126 | 25.2 |  |
|  | r20=+10.99 | | | | −0.0739 |
|  |  | d20=2.25 | air space | |  |
| L11 [ | r21=+32.69 | | | | +0.0219 |
|  |  | d21=2.45 | 1.7161 | 53.6 |  |
|  | r22=+14.61 | | | | +0.0490 |

2. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

the relative numerical values of the radii $r1 - r12$ and of the thicknesses and separations $d1 - d11$ of said front lens L1, said positive second lens L2, said first negative lens member L3, said second negative lens member L4, said third negative lens member L5 and said positive lens member L6, the magnitudes of their refractive indices $n_e$ and Abbe number $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| L1 [ | r1=+41.42 | | | | +0.0191 |
|  |  | d1=1.80 | 1.7917 | 25.8 |  |
|  | r2=+24.03 | | | | −0.0329 |
|  |  | d2=4.50 | air space | |  |
| L2 [ | r3=+27.05 | | | | +0.0251 |
|  |  | d3=6.00 | 1.6808 | 54.9 |  |
|  | r4=−183.60 | | | | +0.0037 |
|  |  | d4=16.32 | air space (variable) | |  |
| L3 [ | r5=+2727.00 | | | | +0.0001 |
|  |  | d5=1.00 | 1.4891 | 70.2 |  |
|  | r6=+16.99 | | | | −0.0287 |
|  |  | d6=3.70 | air space | |  |
| L4 [ | r7 −29.74 | | | | −0.0164 |
|  |  | d7=1.00 | 1.4891 | 70.2 |  |
|  | r8=+279.40 | | | | −0.0017 |
|  |  | d8=8.75 | air space (variable) | |  |
| L5 [ | r9=−18.46 | | | | −0.0264 |
|  |  | d9=1.00 | 1.4891 | 70.2 |  |
|  | r10=−70.15 | | | | +0.0069 |
|  |  | d10=4.24 | air space (variable) | |  |
| L6 [ | r11=+60.03 | | | | +0.0111 |
|  |  | d11=2.40 | 1.6713 | 41.6 |  |
|  | r12=−32.91 | | | | +0.0203 |

3. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

said first component including a positive third lens L2b following said positive second lens L2a, the relative numerical values of the radii $r1 - r12$ and of the thicknesses and separations $d1 - d11$ of said front lens L1, said positive second lens L2a, said positive third lens L2b, said first negative lens member L3, said second negative lens member L4, said third negative lens member L5 and said positive lens member L6, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| | r1=+192.35 | | | | +0.0039 |
| L1 [ | | d1=1.80 | 1.7616 | 27.3 | |
| | r2=+39.09 | | | | −0.0194 |
| | | d2=2.50 | air space | | |
| | r2a=+44.43 | | | | +0.0138 |
| L2a [ | | d2a=4.00 | 1.6167 | 54.8 | |
| | r3a=−958.00 | | | | +0.0006 |
| | | d2b=0.10 | air space | | |
| | r3b=+37.56 | | | | +0.0164 |
| L2b [ | | d3b=3.80 | 1.6176 | 50.8 | |
| | r4b=∞ | | | | ±0.0 |
| | | d4=16.54 | air space (variable) | | |
| | r5=+2727.00 | | | | +0.0001 |
| L3 [ | | d5=1.00 | 1.4891 | 70.2 | |
| | r6=+16.99 | | | | −0.0287 |
| | | d6=3.70 | air space | | |
| | r7=−32.50 | | | | −0.0150 |
| L4 [ | | d7=1.00 | 1.4891 | 70.2 | |
| | r8=+158.20 | | | | −0.0030 |
| | | d8=8.55 | air space (variable) | | |
| | r9=−18.46 | | | | −0.0264 |
| L5 [ | | d9=1.00 | 1.4891 | 70.2 | |
| | r10=−70.15 | | | | +0.0069 |
| | | d10=4.31 | air space (variable) | | |
| | r11=+60.03 | | | | +0.0111 |
| L6 [ | | d11=2.40 | 1.6713 | 41.6 | |
| | r12=−32.91 | | | | +0.0203 |

4. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

said first component including a positive third lens L2b following said positive second lens L2a, said second negative lens member being a doublet composed of a positive lens L4a and a negative lens L4b, the relative numerical values of the radii r1 – r12 and of the thicknesses and separations d1 – d11 of said front lens L1, said positive second lens L2a, said positive third lens L2b, said first negative lens member L3, said positive lens L4a, said negative lens L4b, said third negative lens member L5 and said positive lens member L6, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| | r1=+181.00 | | | | +0.0042 |
| L1 [ | | d1=1.80 | 1.7616 | 27.3 | |
| | r2=+38.99 | | | | −0.0195 |
| | | d2=2.50 | air space | | |
| | r2a=+43.00 | | | | +0.0141 |
| L2a [ | | d2a=4.00 | 1.6099 | 56.3 | |
| | r3a=−451.00 | | | | +0.0013 |
| | | d2b=0.10 | air space | | |
| | r3b=+35.96 | | | | +0.0173 |
| L2b [ | | d3b=3.80 | 1.6254 | 56.6 | |
| | r4b=+641.50 | | | | −0.0009 |
| | | d4=15.51 | air space (variable) | | |
| | r5=+11342.00 | | | | +0.0001 |
| L3 [ | | d5=1.00 | 1.6228 | 60.0 | |
| | r6=+19.23 | | | | −0.0323 |
| | | d6=3.70 | air space | | |
| | r7a=−43.87 | | | | −0.0185 |

Continued

| Lenses | Radii | Thicknesses and separations | $n_e$ | $\nu_e$ | $\Delta n/r$ |
|---|---|---|---|---|---|
| L4a [ | | d7a=2.40 | 1.8126 | 25.2 | |
| | r7b=−20.01 | | | | +0.0094 |
| L4b [ | | d7b=1.00 | 1.6228 | 60.0 | |
| | r8b=+79.77 | | | | −0.0078 |
| | | d8=7.33 | air space (variable) | | |
| | r9=−14.20 | | | | −0.0360 |
| L5 [ | | d9=1.00 | 1.5120 | 64.0 | |
| | r10=−31.49 | | | | +0.0162 |
| | | d10=4.17 | air space (variable) | | |
| | r11=+60.03 | | | | +0.0104 |
| L6 [ | | d11=2.40 | 1.6250 | 52.8 | |
| | r12=−29.54 | | | | +0.0211 |

5. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

said first component including a positive third lens L2b following said positive second lens L2a, said second negative lens member being a doublet composed of a positive lens L4a and a negative lens L4b, the relative numerical values of the radii r1 – r12 and of the thicknesses and separations d1 – d11 of said front lens L1, said positive second lens L2a, said positive third lens L2b, said first negative lens member L3, said positive lens L4a, said negative lens L4b, said third negative lens member L5 and said positive lens member L6, the magnitude of their refractive indices $n_e$ and Abbe numbers $\nu_e$, and the surface power $\Delta n/r$ thereof being substantially as given in the following Table:

| Lenses | Radii | Thicknesses and separations | $n_e$ | $\nu_e$ | $\Delta n/r$ |
|---|---|---|---|---|---|
| | r1=+184.30 | | | | +0.0042 |
| L1 [ | | d1=1.80 | 1.7917 | 25.8 | |
| | r2=+37.45 | | | | −0.0211 |
| | | d2=2.50 | air space | | |
| | r2a=+44.10 | | | | +0.0140 |
| L2a [ | | d2a=5.00 | 1.6176 | 50.8 | |
| | r3a=−401.00 | | | | +0.0015 |
| | | d2b=0.10 | air space | | |
| | r3b=+37.18 | | | | +0.0166 |
| L2b [ | | d3b=5.40 | 1.6176 | 50.8 | |
| | r4b=−550.50 | | | | +0.0011 |
| | | d4=15.44 | air space (variable) | | |
| | r5=+477.50 | | | | +0.0013 |
| L3 [ | | d5=1.00 | 1.6228 | 60.0 | |
| | r6=+18.46 | | | | −0.0337 |
| | | d6=3.70 | air space | | |
| | r7a=−43.87 | | | | −0.0185 |
| L4a [ | | d7a=2.90 | 1.8126 | 25.2 | |
| | r7b=−19.00 | | | | +0.0099 |
| L4b [ | | d7b=1.50 | 1.6228 | 60.0 | |
| | r8b=+67.27 | | | | −0.0092 |
| | | d8=9.01 | air space (variable) | | |
| | r9=−13.50 | | | | −0.0379 |
| L5 [ | | d9=1.00 | 1.5120 | 64.0 | |
| | r10=−30.31 | | | | +0.0168 |
| | | d10=5.85 | air space (variable) | | |
| | r11=+57.44 | | | | +0.0099 |
| L6 [ | | d11=2.40 | 1.5712 | 55.8 | |
| | r12=−27.65 | | | | +0.0206 |

6. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

said first component including a positive third lens L2b and a positive fourth lens L2c following said positive second lens L2a, said second negative lens member being a doublet composed of a negative lens L4a and a positive lens L4b, the relative numerical values of the radii $r1 - r12$ and of the thicknesses and separations $d1 - d11$ of said front lens L1, said positive second lens L2a, said positive third lens L2b, said positive fourth lens L2c, said first negative lens member L3, said negative lens L4a, said positive lens L4b, said third negative lens member L5 and said positive lens member L6, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| L1 [ | r1=−153.40 | | | | −0.0050 |
| | | d1=1.80 | 1.7684 | 26.7 | |
| | r2=+91.53 | | | | −0.0083 |
| | | d2=1.80 | air space | | |
| L2a [ | r2a=+111.98 | | | | +0.0055 |
| | | d2a=4.40 | 1.6228 | 60.0 | |
| | r3a=−159.60 | | | | +0.0039 |
| | | d2b=0.10 | air space | | |
| L2b [ | r3b=+132.70 | | | | +0.0047 |
| | | d3b=4.40 | 1.6255 | 57.7 | |
| | r4b=−132.70 | | | | +0.0047 |
| | | d3c=0.10 | air space | | |
| L2c [ | r4c=+37.18 | | | | +0.0167 |
| | | d4c=4.65 | 1.6228 | 60.0 | |
| | r5c=+102.54 | | | | −0.0060 |
| | | d4=15.87 | air space (variable) | | |
| L3 [ | r5=+150.08 | | | | +0.0047 |
| | | d5=1.00 | 1.7161 | 53.6 | |
| | r6=+16.28 | | | | −0.0439 |
| | | d6=3.70 | air space | | |
| L4a [ | r7a=−60.03 | | | | −0.0107 |
| | | d7a=1.50 | 1.6430 | 59.8 | |
| | r7b=+17.16 | | | | +0.0098 |
| L4b [ | | d7b=3.55 | 1.8126 | 25.2 | |
| | r8b=+62.14 | | | | −0.0130 |
| | | d8=10.23 | air space (variable) | | |
| | r9=−14.55 | | | | −0.0345 |
| L5 [ | | d9=1.00 | 1.5020 | 61.2 | |
| | r10=−41.81 | | | | +0.0120 |
| | | d10=8.50 | air space (variable) | | |
| | r11=+56.91 | | | | +0.0109 |
| L6 [ | | d11=2.40 | 1.6203 | 54.8 | |
| | r12=−32.91 | | | | +0.0188 |

7. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

said first component including a positive third lens L2b and a positive fourth lens L2c following said positive second lens L2a, said second negative lens member being a doublet composed of a positive lens L4a and a negative lens L4b, the relative numerical values of the radii $r1 - r12$ and of the thicknesses and separations $d1 - d11$ of said front lens L1, said positive lens L2a, said positive third lens L2b, said positive fourth lens L2c, said first negative lens member L3, said positive lens L4a, said negative lens L4b, said third negative lens member L5 and said positive lens member L6, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| L1 [ | r1=−155.50 | | | | −0.0048 |
| | | d1=1.80 | 1.7616 | 27.3 | |
| | r2=+92.16 | | | | −0.0082 |
| | | d2=1.60 | air space | | |
| L2a [ | r2a=+116.70 | | | | +0.0053 |
| | | d2a=4.80 | 1.6228 | 60.0 | |
| | r3a=−150.82 | | | | +0.0041 |
| | | d2b=0.10 | air space | | |
| L2b [ | r3b=+113.50 | | | | +0.0054 |
| | | d3b=4.70 | 1.6228 | 60.0 | |
| | r4b=−163.85 | | | | +0.0038 |
| | | d3c=0.10 | air space | | |
| L2c [ | r4c=+37.18 | | | | +0.0167 |
| | | d4c=4.65 | 1.6228 | 60.0 | |
| | r5c=+102.54 | | | | −0.0060 |
| | | d4=17.66 | air space (variable) | | |
| L3 [ | r5=+150.82 | | | | +0.0046 |
| | | d5=1.00 | 1.6940 | 54.4 | |
| | r6=+17.29 | | | | −0.0401 |
| | | d6=3.70 | air space | | |
| L4a [ | r7a=−88.36 | | | | −0.0091 |
| | | d7a=3.05 | 1.8126 | 25.2 | |
| | r7b=−19.64 | | | | +0.0086 |
| L4b [ | | d7b=1.00 | 1.6430 | 59.8 | |
| | r8=+29.13 | | | | −0.0220 |
| | | d8=10.75 | air space (variable) | | |
| | r9=−12.73 | | | | −0.0392 |
| L5 [ | | d9=1.00 | 1.4995 | 66.7 | |
| | r10=−35.96 | | | | +0.0138 |
| | | d10=8.60 | air space (variable) | | |
| | r11=+63.02 | | | | +0.0098 |
| L6 [ | | d11=2.40 | 1.6203 | 54.8 | |
| | r12=−28.09 | | | | +0.0220 |

8. A varifocal objective system comprising a basic multilens objective and a varifocal front attachment for said objective, said attachment being composed of a substantially fixed positive first component, an axially movable negative second component, an axially movable negative third component and a fixed positive fourth component; said first component consisting of a negative first lens followed by at least one positive second lens; said second component consisting of a first and a negative second lens member air-spaced from each other; said third component being a third negative lens member; said fourth component being a positive lens member;

said first component including a positive third lens L2b and a positive fourth lens L2c following said positive second lens L2a, said second negative lens member being a doublet composed of a positive lens L4a and a negative lens L4b, the relative numerical values of the radii $r1 - r12$ and of the thicknesses and separations $d1 - d11$ of said front lens L1, said positive second lens L2a, said positive third lens L2b, said positive fourth lens L2c, said first negative lens member L3, said positive lens L4a, said negative lens L4b, said third negative lens member L5 and said positive lens member L6, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| L1 [ | r1=−137.38 | | | | −0.0055 |
|  |  | d1=2.00 | 1.7616 | 27.3 |  |
|  | r2=+110.25 |  |  |  | −0.0069 |
|  |  | d2=1.80 | air space |  |  |
| L2a [ | r2a=+188.90 |  |  |  | +0.0033 |
|  |  | d2a=6.85 | 1.6255 | 57.7 |  |
|  | r3a=−126.60 |  |  |  | +0.0049 |
|  |  | d2b=0.10 | air space |  |  |
| L2b [ | r3b=+94.06 |  |  |  | +0.0066 |
|  |  | d3b=7.20 | 1.6228 | 60.0 |  |
|  | r4b=−257.20 |  |  |  | +0.0024 |
|  |  | d3c=0.10 | air space |  |  |
| L2c [ | r4c=+48.02 |  |  |  | +0.0129 |
|  |  | d4c=6.75 | 1.6228 | 60.0 |  |
|  | r5c=+212.40 |  |  |  | −0.0029 |
|  |  | d4=18.56 | air space (variable) |  |  |
| L3 [ | r5=+496.40 |  |  |  | +0.0013 |
|  |  | d5=1.00 | 1.6940 | 54.4 |  |
|  | r6=+22.75 |  |  |  | −0.0305 |
|  |  | d6=4.50 | air space |  |  |
| L4a [ | r7a=−137.60 |  |  |  | −0.0059 |
|  |  | d7a=5.00 | 1.8126 | 25.2 |  |
|  | r7b=−21.05 |  |  |  | +0.0080 |
| L4b [ |  | d7b=1.00 | 1.6430 | 59.8 |  |
|  | r8b=+23.27 |  |  |  | −0.0277 |
|  |  | d8=11.87 | air space (variable) |  |  |
| L5 [ | r9=−14.74 |  |  |  | −0.0331 |
|  |  | d9=1.00 | 1.4891 | 70.2 |  |
|  | r10=−56.91 |  |  |  | +0.0085 |
|  |  | d10=13.58 | air space (variable) |  |  |
| L6 [ | r11=+46.49 |  |  |  | +0.0133 |
|  |  | d11=2.40 | 1.6203 | 54.8 |  |
|  | r12=−44.43 |  |  |  | +0.0139 |

* * * * *